United States Patent [19]

Brandt et al.

[11] Patent Number: 5,447,792
[45] Date of Patent: Sep. 5, 1995

[54] MULTILAYER, STRETCHED HEAT-SEALABLE POLYPROPYLENE FILM COMBINING GOOD SURFACE SLIP WITH IMPROVED BARRIER PROPERTIES

[75] Inventors: Rainer Brandt, Walsrode; Ulrich Reiners, Neuenkirchen; Anton Krallmann, Fallingbostel; Eberhard Albinus, Bomlitz; Neele Neelen, Fallingbostel, all of Germany

[73] Assignee: Wolff Walsrode Aktiengesellschaft, Walsrode, Germany

[21] Appl. No.: 206,318

[22] Filed: Mar. 3, 1994

[30] Foreign Application Priority Data

Mar. 10, 1993 [DE] Germany ............... 43 07 441.3

[51] Int. Cl.6 ............................................. B32B 7/12
[52] U.S. Cl. .................................. 428/349; 428/516; 428/910
[58] Field of Search .................... 428/349, 910, 516

[56] References Cited

U.S. PATENT DOCUMENTS 5,326,625  7/1994  Schuhmann et al. ............ 428/215

*Primary Examiner*—Edith Buffalow
*Attorney, Agent, or Firm*—William C. Gerstenzang; Sprung Horn Kramer & Woods

[57] ABSTRACT

The invention relates to oriented, sealable polypropylene film combining an improved water vapor barrier effect with a considerably reduced coefficient of friction for packaging purposes, characterized in that they are free from polydimethyl siloxane and have the following structure:

A B C B A where a) C is the core layer consisting of polypropylene and a hydrocarbon resin, which has a molecular weight of up to about 2000 g/mol and a softening point above 130° C., and 0.05 to 0.5% by weight erucic acid amide, b) the B's are two jacket layers of highly isotactic polypropylene (isotacticity >94%) free from hydrocarbon resin, the ratio between the thickness of the jacket layer and the thickness of the base layer being between 0.01 and 0.1, c) the A's are two surface layers of a heat-sealable polyolefin copolymer or terpolymer, these surface layers containing at least one antiblocking agent, an antistatic agent and, as lubricant, 0.05 to 0.5% by weight erucic acid amide.

7 Claims, No Drawings

MULTILAYER, STRETCHED HEAT-SEALABLE POLYPROPYLENE FILM COMBINING GOOD SURFACE SLIP WITH IMPROVED BARRIER PROPERTIES

This invention relates to a multilayer, stretched heat-sealable polypropylene film which combines good surface slip and an improved barrier effect against water vapor with reduced global migration. The characteristic features of the film according to the invention are a base layer of polypropylene, hydrocarbon resin and erucic acid amide as lubricant, two layers of highly isotactic polypropylene which surround the base layer and which are free from hydrocarbon resin and erucic acid amide (hereinafter referred to as jacket layers) and two heat-sealable surface layers of an olefinic copolymer or terpolymer containing erucic acid amide.

If polypropylene films are to be used in high-speed packaging machines, films having good surface slip have to be used. High-speed packaging machines are used in particular in the wrapping of cigarette packets (up to 800 packets per minute). Polydimethyl siloxanes are normally used as lubricants in the production of high-slip polypropylene films. Thus, EP-B 0 027 586 describes a polypropylene film of high surface slip in which polydimethyl siloxane is used as lubricant. Although the film shows good surface slip properties, its water vapor barrier effect is unsatisfactory.

EP-B 247 898 describes a polypropylene film which has improved mechanical and optical properties through the addition of hydrocarbon resin. The film in question also shows improved barrier properties against water vapor and oxygen.

Unfortunately, the surface slip of this film is far from optimal owing to the use of tacky hydrocarbon resin (the main application for hydrocarbon resins is in hot-melt adhesives).

EP-A 468 333 describes a polypropylene film containing hydrocarbon resin which has improved barrier properties against water vapor and oxygen coupled with improved smoothness of passage through machinery.

However, this improved smoothness of passage is still inadequate for high-speed packaging machines. In addition, a film with a content of hydrocarbon resin (10 to 40% by weight) has very high global migration values.

The global migration is a measure of the total quantity of particles which migrate from the film into the contents of the pack (particularly foods) during contact of the film therewith.

Films of the type according to the invention have an at least 30% lower global migration than three-layer films with a comparable water vapor barrier effect. Accordingly, the problem addressed by the present invention was to provide a film which would show very good surface slip for use in high-speed packaging machines coupled with good water vapor barrier properties and low global migration.

This problem has been solved by a film according to claim 1. Preferred features are that the base layer of polypropylene additionally contains a hydrocarbon resin in a quantity of 1 to 40% by weight and, more particularly, in a quantity of 5 to 30% by weight (both here and in the following, percentages by weight are based on the particular layer) and 0.05 to 0.5% by weight erucic acid amide. The base layer preferably consists of an isotactic polypropylene having a melting point of 160° C. to 170° C. which is characterized in that it has a melt flow index (MFI) in the range from 1 g/10 mins. to 9 g/10 mins. and, more particularly, in the range from 1.6 to 4.2 g/10 mins., as measured at 230° C. under a load of 2.16 kg (DIN 53 735).

The low molecular weight hydrocarbon resin is a resin which is characterized by a softening point of >130° C. (ASTM E 28). It is known from the literature (EP 468 333) that the incorporation of such a resin leads to improvements in water vapor barrier properties, optical properties and mechanical properties. The hydrocarbon resins may be divided into three groups, namely: petroleum resins, terpene resins, and coal tar resins. Within the group of petroleum resins, cyclopentadiene, styrene and methyl styrene resins are preferably used. The resins in question are oligomeric polymers or copolymers having molecular weights below 2000 g/mol. Since the polypropylene films are usually made colorless and transparent, the resins have to be completely hydrogenated in the presence of a catalyst. Terpene resins essentially contain oligomeric hydrogenated polymers of the monomers pinene, $\beta$-pinene and dipentene (D, L limonene) and are also used for the modification of polypropylene. Hydrogenated oligomeric cyclopentadiene resins (HOCP) having softening points of or above 130° C. are particularly suitable for improving the water vapor barrier effect of polypropylene.

The erucic acid amide preferably used is characterized in that it has an amide content of at least 98% (as determined by IR spectroscopy) and an erucic acid content of at least 90% (as determined by gas chromatography).

The jacket layers are free from hydrocarbon resin and erucic acid amide and contain a highly isotactic polypropylene which is characterized by an isotacticity of greater than 94% (as measured by $^{13}$C-NMR, J. C. Randall, J. Polym. Sci.: J. Polym. Phys, Ed. 12, 703–712 (1974) and 14, 1693–1700 (1976)). A material having a melting point of 158° to 170° C. is preferred. The thickness of the jacket layers is in the range from 0.5 $\mu$m to 2 $\mu$m.

To guarantee smooth passage through machinery coupled with good sealing properties, additives have to be incorporated in the sealing or surface layers. Among the many materials which may be used for such layers, the following are preferred:

statistical propylene/ethylene copolymers
statistical propylene/1-butene copolymers
statistical propylene/ethylene/olefin terpolymers
mixtures of two or three of the polymers mentioned above.

A copolymer containing 90 to 99% polypropylene and 1.0 to 10% polyethylene is particularly preferred. This sealing layer material is characterized by a melting point in the range from 110° C. to 150° C. and, more particularly, in the range from 120° C. to 140° C.

Antistatic agents, lubricants and antiblocking agents are used as additives for improving smoothness of passage through machinery.

Antistatic agents are substances of which part of the molecule is hydrophilic and which have a long-chain hydrophobic hydrocarbon radical. In the films, these substances are oriented in such a way that the hydrophilic part is able to accumulate water at the surface of the film, resulting in a reduction in surface resistance which ultimately makes up the antistatic effect. Preferred antistatic agents are ethoxylated amines, N-($C_{12-18}$-alkyl)-N',N''-bis-(2-hydroxyethyl)-amines in particular combining safeness for use in the food industry with an antistatic effect.

Carboxylic acid amides are used as lubricants. Typical examples are erucic acid amide and oleic acid amide. Polymers from the group of polyalkyl siloxanes are also used. It has surprisingly been found that polydimethyl siloxane does not have a good effect in films containing hydrocarbon resin whereas the use of erucic acid amide in a concentration of 0.05 to 0.5% by weight (based on the surface layer), in conjunction with the five-layer structure, leads to films having good surface slip.

Preferred antiblocking agents are silicon dioxide, silicates or polymers which are immiscible with the raw materials used for the surface layers (for example polycarbonate, polyamide, polymethyl methacrylate). $SiO_2$ above all in a concentration of 0.1 to 0.3% by weight (based on the surface layer) has proved to be a good antiblocking agent for the high-slip polypropylene film containing hydrocarbon resin.

The films according to the invention may be produced by standard methods, such as lamination, coating or melt co-extrusion. After solidification of the thick film on casting rollers, the film is longitudinally stretched in a ratio of 4:1 to 7:1 at a temperature of 120° C. to 150° C. The stretching ratio in the transverse direction is preferably from 8:1 to 12:1, the film being transversely stretched at a temperature in the range from 130° C. to 170° C. The subsequent heat-fixing step is preferably carried out at a temperature of 1° C. to 40° C. below the transverse stretching temperature. To guarantee the affinity of the substantially apolar film surface for printing inks, the film has to be subjected to a corona (spray) pretreatment. In this way, atmospheric oxygen is incorporated in the surface of the film in the form of carbonyl, epoxide, ether or alcohol groups. Other methods for the pretreatment of polypropylene films are flame pretreatment, plasma pretreatment and fluorine pretreatment.

EXAMPLE 1

A biaxially oriented film (surface stretching ratio 45:1; longitudinal stretching temperature 142° C.; transverse stretching temperature 160° C.) produced by the method described above had the following structure (all quantities in % by weight are based on the particular layer):

Total thickness: 25 μm

Surface Layers

Thickness: 1 μm
Material: Propylene/ethylene copolymer containing 3.5% ethylene, MFI: 5.0 g/10 mins., 0.125% $SiO_2$, mean particle size: 2.0 μm, 0.15% erucic acid amide, amide content >98% erucic acid content >90%

Jacket Layers

Thickness: 1 μm
Material: Highly isotactic polypropylene; isotacticity: 97%

Core Layer

Thickness: 21 μm
Material: 69.85% isotactic polypropylene, MFI: 3.0 g/10 mins.
30% hydrocarbon resin master batch (based on polypropylene, resin content 50%), softening point: 140° C.; the hydrocarbon resin is a hydrogenated oligomeric cyclopentadiene resin, 0.15% by weight erucic acid amide; amide content >98%, erucic acid content >90%.

EXAMPLE 2

A film was produced in the same way as in Example 1 except that the core layer contained 0.2% by weight erucic acid amide.

EXAMPLE 3

A film was produced in the same way as in Example 1 except that the core layer contained 0.25% by weight erucic acid amide.

Comparison Example 1

A film was produced in the same way as in Example 1, except that it contained no erucic acid amide in its core or its surface layers, instead the surface layers contained 0.7% by weight polydimethyl siloxane.

Comparison Example 2

A film was produced in the same way as in Example 1, except that it contained no erucic acid amide in its core or its surface layers, instead the surface layers contained 0.3% by weight polydimethyl siloxane.

Comparison Example 3

A three-layer film was produced with surface layers and a core layer as in Comparison Example 1, but no jacket layers.

The following Table shows that a film of the type according to the invention has considerable advantages in regard to surface slip for the same water vapor barrier effect.

|  | Wv.imp./g/m² d | Friction coefficient μ |
| --- | --- | --- |
| Example 1 | 0.60 | 0.28 |
| Example 2 | 0.67 | 0.26 |
| Example 3 | 0.62 | 0.25 |
| Comparison Example 1 | 0.59 | 0.37 |
| Comparison Example 2 | 0.63 | 0.43 |
| Comparison Example 3 | 0.62 | 0.48 |

Measuring Methods

Determination of Impermeability to Water Vapor

Impermeability to water vapor was determined in accordance with DIN 53 122, Part 2, at 23° C./85% relative air humidity difference.

Determination of friction:

Friction behavior (film/film) was measured on the pretreated sides one week after production in accordance with DIN 53 375.

We claim:

1. A biaxially oriented, heat-sealable polypropylene film combining an improved water vapor barrier effect with a considerably reduced coefficient of friction for packaging purposes, which is free from polydimethyl siloxane and has the following structure:

A B C B A where a) C is the core layer consisting of polypropylene and a hydrocarbon resin, which has a molecular weight of up to about 2000 g/mol and a softening point above 130° C., and 0.05 to 0.5 by weight erucic acid amide, b) the B's are two jacket layers of highly isotactic polypropylene (isotacticity >94%) free from hydrocarbon resin, the ratio between the thickness of the jacket layer and the thickness of the base layer being between 0.01 and 0.1, c) the A's are two surface layers of a heat-sealable polyolefin eopolymer or terpolymer, these surface layers containing at least one antiblocking agent, an antistatic agent and, as lubricant, 0.05 to 0.5% by weight erucic acid amide.

2. A sealable film as claimed in claim 1, wherein the base layer contains a hydrocarbon resin from the group of petroleum resins, terpene resins or coal tar resins.

3. A sealable film as claimed in claim 2, wherein the hydrocarbon resin is a hydrogenated oligomeric cyclopentadiene resin.

4. A sealable film as claimed in claim 1, wherein the surface layers consist essentially of a
  statistical propylene/ethylene copolymer
  statistical propylene/1-butene copolymer
  statistical propylene/ethylene/olefin terpolymer
  mixtures of two or three of the polymers mentioned above.

5. A sealable film as claimed in claim 1, wherein the surface layers A contain silicon dioxide, calcium carbonate, polymethyl methacrylate, polycarbonate, silicone or HDPE (high-density polyethylene) as antiblocking agents.

6. A sealable film as claimed in claim 1, wherein the base layer C, the surface layers A, or both, contain an antistatic agent.

7. A film as claimed in claim 1, pretreated on one or both sides by corona, flame, plasma or fluorine pretreatment.

* * * * *